United States Patent
Lawrence et al.

(10) Patent No.: US 6,347,867 B1
(45) Date of Patent: Feb. 19, 2002

(54) INK JET PRINTING METHOD

(75) Inventors: Kristine B. Lawrence, Rochester; Jin-Shan Wang, Pittsford, both of NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/770,431

(22) Filed: Jan. 26, 2001

(51) Int. Cl.[7] .............................. B41J 2/01; B41J 3/407
(52) U.S. Cl. ..................... 347/105; 347/106; 428/195
(58) Field of Search .................... 428/195; 347/105, 347/106

(56) References Cited

U.S. PATENT DOCUMENTS

| | | | | |
|---|---|---|---|---|
| 5,098,475 A | * | 3/1992 | Winnik et al. | 106/212 |
| 5,663,247 A | * | 9/1997 | Sorensen et al. | 525/533 |
| 6,045,917 A | * | 4/2000 | Missell et al. | 428/411.1 |
| 6,162,578 A | * | 12/2000 | Zheng et al. | 430/270.1 |

* cited by examiner

*Primary Examiner*—Bruce H. Hess
*Assistant Examiner*—Michael E. Grendzynski
(74) *Attorney, Agent, or Firm*—Harold E. Cole

(57) ABSTRACT

An ink jet printing method, comprising the steps of:
  A) providing an ink jet printer that is responsive to digital data signals;
  B) loading the printer with ink-receptive elements comprising a support having thereon an image-receiving layer comprising a highly branched dendrimer or hyperbranched polymer having a cationic moiety;
  C) loading the printer with an ink jet ink composition comprising water, a humectant, and a water-soluble anionic dye; and
  D) printing on the image-receiving layer using the ink jet ink in response to said digital data signals.

20 Claims, No Drawings

INK JET PRINTING METHOD

CROSS REFERENCE TO RELATED APPLICATIONS

Reference is made to commonly assigned, co-pending U.S. patent applications:

Ser. No. 09/770,814 by Bermel et al., filed Jan. 26, 2001 entitled "Ink Jet Recording Element";
Ser. No. 09/771,191 by Bermel et al., filed Jan. 26, 2001 entitled "Ink Jet Recording Element";
Ser. No. 09/770,429 by Bermel et al., filed Jan. 26, 2001 entitled "Ink Jet Recording Element";
Ser. No. 09/770,782 by Bermel et al., filed Jan. 26, 2001 entitled "Ink Jet Recording Element";
Ser. No. 09/771,189 by Bermel et al., filed Jan. 26, 2001 entitled "Ink Jet Printing Method";
Ser. No. 09/770,433 by Bermel et al., filed Jan. 26, 2001 entitled "Ink Jet Printing Method";
Ser. No. 09/770,807 by Bermel et al., filed Jan. 26, 2001 entitled "Ink Jet Printing Method";
Ser. No. 09/770,728 by Bermel et al., filed Jan. 26, 2001 entitled "Ink Jet Printing Method";
Ser. No. 09/770,128 by Lawrence et al., filed Jan. 26, 2001 entitled "Ink Jet Printing Method".
Ser. No. 09/770,127 by Lawrence et al., filed Jan. 26, 2001 entitled "Ink Jet Printing Method";
Ser. No. 09/770,781 by Lawrence et al., filed Jan. 26, 2001 entitled "Ink Jet Printing Method";
Ser. No. 09/771,251 by Lawrence et al., filed Jan. 26, 2001 entitled "Ink Jet Printing Method";
Ser. No. 09/770,122 by Lawrence et al., filed Jan. 26, 2001 entitled "Ink Jet Printing Method"; and
Ser. No. 772,097 by Lawrence et al., filed Jan. 26, 2001 entitled "Ink Jet Printing Method".

FIELD OF THE INVENTION

This invention relates to an ink jet printing process for improving the light stability, waterfastness and density of a printed image containing an ink jet ink containing a water-soluble anionic dye and a cationic receiver.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink. droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye based or pigment-based. A dye is a colorant which is molecularly dispersed or solvated by a carrier medium. The carrier medium can be a liquid or a solid at room temperature. A commonly used carrier medium is water or a mixture of water and organic co-solvents. Each individual dye molecule is surrounded by molecules of the carrier medium. In dye-based inks, no particles are observable under the microscope. Although there have been many recent advances in the art of dye-based ink jet inks, such inks still suffer from deficiencies such as low optical densities on plain paper and poor light-fastness. When water is used as the carrier medium, such inks also generally suffer from poor water-fastness.

An ink jet recording element typically comprises a support having on at least one surface thereof an ink-receiving or image-forming layer. The ink-receiving layer may be a polymer layer which swells to absorb the ink or a porous layer which imbibes the ink via capillary action.

Ink jet prints, prepared by printing onto ink jet recording elements, are subject to environmental degradation. They are especially vulnerable to water smearing, dye bleeding, coalescence and light fade. For example, since ink jet dyes are water-soluble, they can migrate from their location in the image layer when water comes in contact with the receiver after imaging. Highly swellable hydrophilic layers can take an undesirably long time to dry, slowing printing speed, and will dissolve when left in contact with water, destroying printed images. Porous layers speed the absorption of the ink vehicle, but often suffer from insufficient gloss and severe light fade.

U.S. Pat. No. 5,663,247 relates to a hyperbranched polymer and a synthesis thereof. However, there is no disclosure in this patent of the use of such polymers in an ink jet printing method.

U.S. Pat. No. 5,098,475 relates to the use of a dendritic polymeric dye in an ink jet ink. However, there is no disclosure in this patent of the use of such polymers in an ink jet receiving element.

U.S. Pat. No. 6,045,917 relates to the use of poly(N-vinyl benzyl-N,N,N-trimethyl ammonium chloride-co-ethyleneglycol dimethacrylate) in an ink jet image-recording layer. However, there is a problem in that images formed in the image-receiving layer of this composition have poor light stability, as will be shown hereafter.

It is an object of this invention to provide an ink jet printing method using anionic dyes suitable for use in aqueous inks for ink jet printing that will provide images with better light stability, density and waterfastness using certain receiver elements.

SUMMARY OF THE INVENTION

This and other objects are achieved in accordance with this invention which relates to an ink jet printing method, comprising the steps of:

A) providing an ink jet printer that is responsive to digital data signals;
B) loading the printer with ink-receptive elements comprising a support having thereon an image-receiving layer comprising a highly branched dendrimer or hyperbranched polymer having a cationic moiety;
C) loading the printer with an ink jet ink composition comprising water, a humectant, and a water-soluble anionic dye; and D) printing on the image-receiving layer using the ink jet ink in response to said digital data signals.

It has been found that use of the above dyes and image-receiving layer provides excellent light stability, waterfastness and density.

DETAILED DESCRIPTION OF THE INVENTION

Any anionic, water-soluble dye may be used in composition employed in the method of the invention such as a dye having an anionic group, e.g., a sulfo group or a carboxylic group. The anionic, water-soluble dye may be any acid dye, direct dye or reactive dye listed in the COLOR INDEX but is not limited thereto. Metallized and non-metallized azo dyes may also be used as disclosed in U.S. Pat. No. 5,482,545, the disclosure of which is incorporated herein by reference. Other dyes which may be used are found in EP 802246-A1 and JP 09/202043, the disclosures of which are incorporated herein by reference. In a preferred embodiment, the anionic, water-soluble dye which may be used in the composition employed in the method of the invention is a metallized azo dye, a non-metallized azo dye, a xanthene dye, a metallophthalocyanine dye or a sulfur dye. Mixtures of these dyes may also be used. An example of an anionic dye which may be used in the invention is as follows:

Dye 1

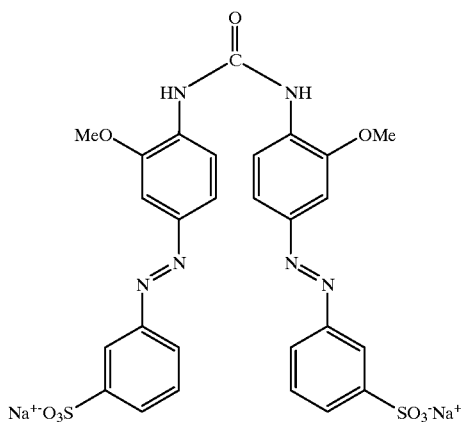

(Me is methyl)
Intrajet Yellow DG®
(Crompton and Knowles)

Dye 2

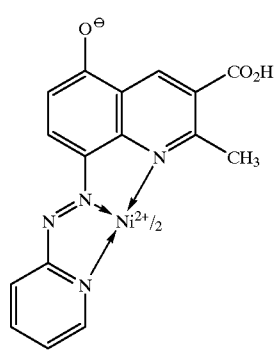

The dyes described above may be employed in any amount effective for the intended purpose. In general, good results have been obtained when the dye is present in an amount of from about 0.2 to about 5% by weight of the ink jet ink composition, preferably from about 0.3 to about 3% by weight. Dye mixtures may also be used.

Compared with conventional polymers, dendritic polymers (dendrimers) provide some unique advantages. First, the intrinsic viscosity of a dendrimer is lower compared with a linear analog with the same molecular weight. Secondly, the level of interaction between solvent and a dendrimer is decreased and the dendrimer becomes much more compact. Third, if the functional groups are located at the end of dendrimer, the functional group becomes more accessible and occupies a much higher surface area.

The highly branched dendrimer or hyperbranched polymer useful in the invention may be made by a condensation reaction as disclosed by Kim, et al., J. Am. Chem. Soc., 112, 4592 (1990); Hawker, et al. ibid, 113, 4583 (1991) and in U.S. Pat. No. 5,587,441, the disclosures of which are hereby incorporated by reference.

In a preferred embodiment of the invention, the highly branched dendrimer or hyperbranched polymer having a cationic moiety has the formula:

$$HB-T_n$$

wherein:
HB is highly branched dendrimer or hyperbranched polymer core;
T is $Q^+X^-$ wherein $Q^+$ is a cationic moiety and $X^-$ is a counterion; and
n is an integer of at least 2.

In another preferred embodiment of the invention, the HB is prepared by a chain polymerization of a monomer of the formula $$M^1-R^1-M^2_m$$

wherein:
$R^1$ is a linear or branched alkyl, carbonyl, or aromatic moiety;
$M^1$ and $M^2$ are reactive groups that react independently of each other;
$M^1$ is a polymerizable group;
$M^2$ is a reactive precursor which initiates the polymerization of $M^1$; and
m is an integer of at least 1.

In still another preferred embodiment of the invention, the HB is prepared by a condensation or addition polymerization of a monomer of the formula $$M^3-R^2-M^4_p$$

wherein:
$R^2$ is a linear or branched alkyl or aromatic moiety,
$M^3$ and $M^4$ are groups that undergo a condensation or addition reaction; and
p is an integer of at least 2.

In yet still another preferred embodiment of the invention, the HB is prepared by a condensation or addition polymerization of monomers having the formula $$R^2-M^5_q \text{ and } R^3-M^6_t$$

wherein:

R² is as defined as above;

R³ is a linear or branched alkyl or aromatic moiety;

M⁵ and M⁶ are groups that undergo a condensation or addition reaction;

q is an integer of at least 2; and t an integer of at least 3.

In still another preferred embodiment of the invention, $M^1$ is a non-substituted or substituted vinyl group; $M^2$ is Y, —CH$_2$Y or —CH(CH$_3$)Y; Y is Cl, Br, I, S—C(=S)ZR$^4$R$^5$ (Z=O,N), or —O—NR$^4$R$^5$; and R$^4$ and R$^5$ are independently —(CH$_2$)$_r$ (r=1–12), —C$_6$H$_5$, —C(O)O, or C(O).

In still another preferred embodiment of the invention, $M^3$ and $M^4$ are each independently —COOH, —OH, —C(O)Cl, epoxy, or NH$_2$; $R^2$ is —C$_6$H$_3$—, —(CH$_2$)$_r$ (r=1–12) or C(R$^6$)—; and R$^6$ is a linear or branched alkyl or aromatic group.

In still another preferred embodiment of the invention, $M^5$ and $M^6$ are each independently —COOH, —OH, —C(O)Cl, epoxy, or NH$_2$; and $R^2$ and $R^3$ are each independently —C$_6$H$_4$—, —C$_6$H$_4$—O—C$_6$H$_4$—, —C$_6$H$_3$, N(CH$_2$)$_3$—, —C$_4$H$_8$—, —C$_6$H$_{10}$—,

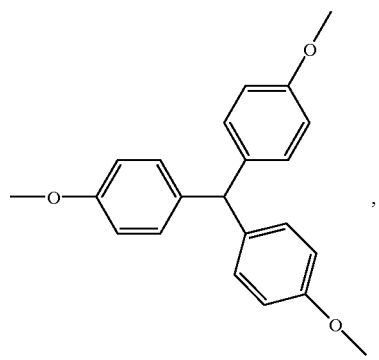

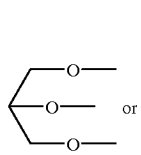 or 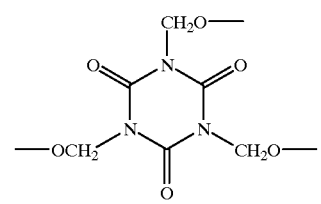

In still another preferred embodiment of the invention, Q is imidazole, pyridyl, substituted alkyl amine, —P(Phenyl)$_3$ or —P(R$^7$)$_3$ wherein R$^7$ is a linear or branched alkyl group.

In still another preferred embodiment of the invention, X can be an anion or a mixture of anions such as halide (e.g., chloride or bromide), alkylsulfate (e.g. methylsulfate), alkylsulfonate (e.g. methylsulfonate), arylsulfonate (e.g. benzenesulfonate or toluenesulfonate), or acetate. The preferred anion is chloride or acetate.

In still another preferred embodiment of the invention, the highly branched dendrimer or hyperbranched polymer having a cationic moiety has a molecular weight of from about 150 to about 1,000,000.

In still another preferred embodiment of the invention, the highly branched dendrimer or hyperbranched polymer has a ratio of weight-average molecular weight to number-average molecular weight of from about 1.01 to 50.

Specific examples of dendritic polymers which may be used in the invention include the following:

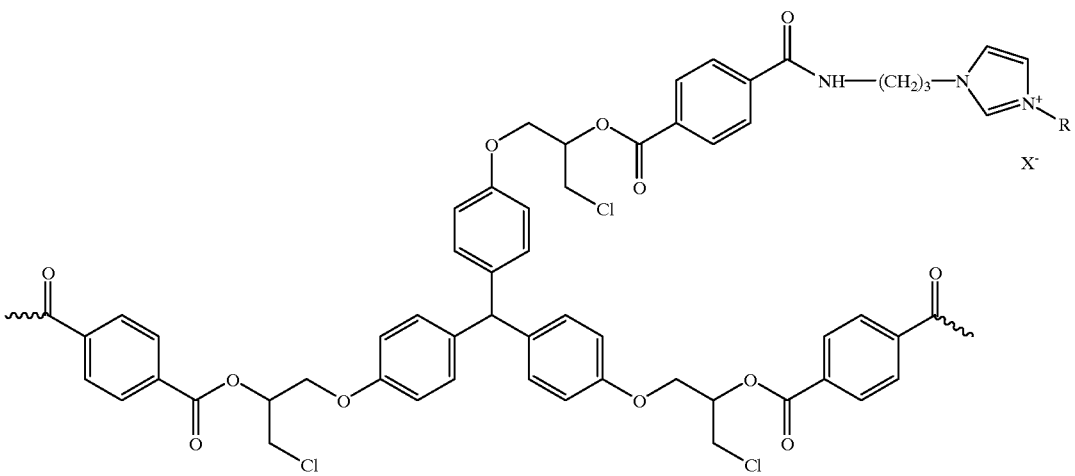

| Polymer | R | X |
|---|---|---|
| P-1 | —CH$_2$CH$_2$OH | Cl |
| P-2 | —CH$_2$C$_6$H$_5$ | Cl |

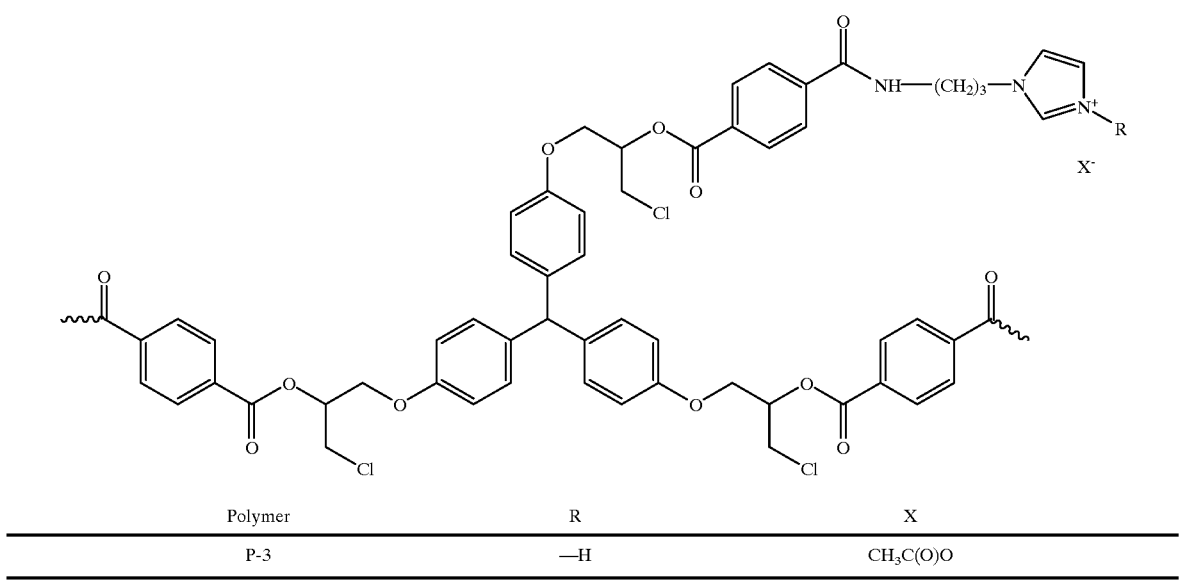

| Polymer | R | X |
|---|---|---|
| P-3 | —H | CH₃C(O)O |

Other specific examples of dendritic polymers useful in the invention include the following:

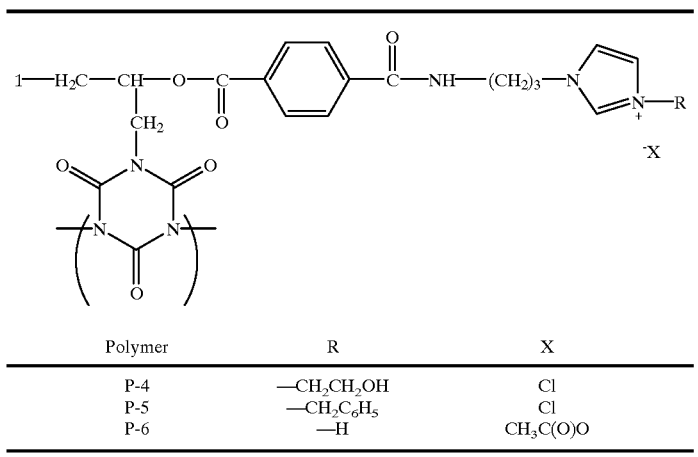

| Polymer | R | X |
|---|---|---|
| P-4 | —CH₂CH₂OH | Cl |
| P-5 | —CH₂C₆H₅ | Cl |
| P-6 | —H | CH₃C(O)O |

The highly branched dendrimer or hyperbranched polymer having a cationic moiety employed in the invention can be used in an amount of from 0.2 to about 32 g/m², preferably from about 0.4 to about 16 g/m². Preferably, these polymers are water-dispersible or water-soluble.

A binder may also be employed in the image-receiving layer. In a preferred embodiment, the binder is a hydrophilic polymer. Examples of hydrophilic polymers useful in the invention include poly(vinyl alcohol), polyvinylpyrrolidone, poly(ethyl oxazoline), poly-N-vinylacetamide, non-deionized or deionized Type IV bone gelatin, acid processed ossein gelatin, pig skin gelatin, acetylated gelatin, phthalated gelatin, oxidized gelatin, chitosan, poly(alkylene oxide), sulfonated polyester, partially hydrolyzed poly(vinyl acetate-co-vinyl alcohol), poly(acrylic acid), poly(1-vinylpyrrolidone), poly(sodium styrene sulfonate), poly(2-acrylamido-2-methane sulfonic acid), polyacrylamide or mixtures thereof. In a preferred embodiment of the invention, the binder is gelatin or poly(vinyl alcohol).

If a hydrophilic polymer is used, it is employed in an amount of from about 0.02 to about 30 g/m², preferably from about 0.04 to about 16 g/m² of the image-receiving layer.

The weight ratio of highly branched dendrimer or hyperbranched polymer having a cationic moiety to binder is from about 1:99 to about 8:2, preferably from about 1:9 to about 4:6.

Latex polymer particles and/or inorganic oxide particles may also be used in the binder in the image-receiving layer to increase the porosity of the layer and improve the dry time. Preferably the latex polymer particles and/or inorganic oxide particles are cationic or neutral. Examples of inorganic oxide particles include barium sulfate, calcium carbonate, clay, silica or alumina, or mixtures thereof. In that case, the weight % of particulates in the image receiving layer is from about 80 to about 95%, preferably from about 85 to about 90%.

The pH of the aqueous ink compositions employed in the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A humectant is employed in the ink jet composition employed in the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2, 6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. A preferred humectant for the composition employed in the invention is diethylene glycol, glycerol, or diethylene glycol monobutylether.

Water-miscible organic solvents may also be added to the aqueous ink employed in the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Surfactants may be added to adjust the surface tension of the ink to an appropriate level. The surfactants may be anionic, cationic, amphoteric or nonionic.

A biocide may be added to the composition employed in the invention to suppress the growth of microorganisms such as molds, fungi, etc. in aqueous inks. A preferred biocide for the ink composition employed in the present invention is Proxel® GXL (Zeneca Specialties Co.) at a final concentration of 0.0001–0.5 wt. %.

A typical ink composition employed in the invention may comprise, for example, the following substituents by weight: colorant (0.05–5%), water (20–95%), a humectant (5–70%), water miscible co-solvents (2–20%), surfactant (0.1–10%), biocide (0.05–5%) and pH control agents (0.1–10%).

Additional additives which may optionally be present in the ink jet ink composition employed in the invention include thickeners, conductivity enhancing agents, anti-kogation agents, drying agents, and defoamers.

The ink jet inks employed in this invention may be employed in ink jet printing wherein liquid ink drops are applied in a controlled fashion to an ink receptive layer substrate, by ejecting ink droplets from a plurality of nozzles or orifices of the print head of an ink jet printer.

The image-recording layer used in the process of the present invention can also contain various known additives, including matting agents such as titanium dioxide, zinc oxide, silica and polymeric beads such as crosslinked poly (methyl methacrylate) or polystyrene beads for the purposes of contributing to the non-blocking characteristics and to control the smudge resistance thereof; surfactants such as non-ionic, hydrocarbon or fluorocarbon surfactants or cationic surfactants, such as quaternary ammonium salts; fluorescent dyes; pH controllers; anti-foaming agents; lubricants; preservatives; viscosity modifiers; dye-fixing agents; waterproofing agents; dispersing agents; UV-absorbing agents; mildew-proofing agents; mordants; antistatic agents, anti-oxidants, optical brighteners, and the like. A hardener may also be added to the ink-receiving layer if desired.

The support for the ink jet recording element used in the invention can be any of those usually used for ink jet receivers, such as paper, resin-coated paper, polyesters, or microporous materials such as polyethylene polymer-containing material sold by PPG Industries, Inc., Pittsburgh, Pa. under the trade name of Teslin®, Tyvek® synthetic paper (DuPont Corp.), and OPPalyte® films (Mobil Chemical Co.) and other composite films listed in U.S. Pat. No. 5,244,861. Opaque supports include plain paper, coated paper, synthetic paper, photographic paper support, melt-extrusion-coated paper, and laminated paper, such as biaxally oriented support laminates. Biaxally oriented support laminates are described in U.S. Pat. Nos. 5,853,965; 5,866,282; 5,874,205; 5,888,643; 5,888,681; 5,888,683; and 5,888,714, the disclosures of which are hereby incorporated by reference. These biaxally oriented supports include a paper base and a biaxially oriented polyolefin sheet, typically polypropylene, laminated to one or both sides of the paper base. Transparent supports include glass, cellulose derivatives, e.g., a cellulose ester, cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly(butylene terephthalate), and copolymers thereof; polyimides; polyamides; polycarbonates; polystyrene; polyolefins, such as polyethylene or polypropylene; polysulfones; polyacrylates; polyetherimides; and mixtures thereof The papers listed above include a broad range of papers, from high end papers, such as photographic paper to low end papers, such as newsprint.

The support used in the invention may have a thickness of from about 50 to about 500 $\mu$m, preferably from about 75 to 300 $\mu$m. Antioxidants, antistatic agents, plasticizers and other known additives may be incorporated into the support, if desired. In a preferred embodiment, paper is employed.

In order to improve the adhesion of the image-recording layer to the support, the surface of the support may be subjected to a corona-discharge-treatment prior to applying the image-recording layer.

In addition, a subbing layer, such as a layer formed from a halogenated phenol or a partially hydrolyzed vinyl chloride-vinyl acetate copolymer can be applied to the surface of the support to increase adhesion of the image recording layer. If a subbing layer is used, it should have a thickness (i.e., a dry coat thickness) of less than about 2 µm.

The image-recording layer may be present in any amount which is effective for the intended purpose. In general, good results are obtained when it is present in an amount of from about 2 to about 44 $g/m^2$, preferably from about 6 to about 32 $g/m^2$, which corresponds to a dry thickness of about 2 to about 40 µm, preferably about 6 to about 30 µm.

The following examples illustrates the utility of the present invention.

EXAMPLES

The following polymers were used as controls in the image-receiving layer:

CP-1: poly(N-vinylbenzyl-N,N,N-trimethylammonium chloride-co-divinylbenzene) (about 90/10 mol %) (U.S. Pat. No. 6,045,917)

CP-2: poly(styrene-co-N-vinylbenzyl-N,N,N-trimethylammonium chloride-co-divinylbenzene) (about 49/49/2 mol %) (U.S. Pat. No. 6,045,917)

CP-3: poly(N-vinylimidazole-co-3-hydroxyethyl-1-vinylimidazolium chloride) (about 50/50 mol %)

Example 1

Synthesis of P-1

The quaternized hyperbranched polymer P-1 was synthesized by two-step procedure. The first step involved charging terephthaloyl chloride (99.2 g, 489 mmol) and tetrabutylammonium bromide (15.75 g, 48.9 mmol) into a 2 L flask along with a stir bar in a dry box. The flask was septumed and removed from the dry box. Triphenylolmethane triglycidyl ether (75 g, 163 mmol) and 510 ml of toluene were added and the solution was stirred at 100° C. in a nitrogen atmosphere. After one hour polymerization, a mixture of dimethylformamide (1 L), 1-(3-aminopropyl)imidazole (67.3 g, 537 mmol), and triethylamine (5.4 g, 53.7 mmol) was added to the above solution. After amidation was carried out for about 15 hours, 132 g of imidazole-ended hyperbranched polyester was precipitated out from 10 L of methanol, collected by suction filtration and dried in a vacuum oven.

The polymer was characterized by gel permeable chromatography (GPC) to determine the molecular weight and molecular weight distribution as defined by the ratio of weight average molecular weight (Mw) to number average molecular weight (Mn). GPC of the final polymer: Mw=11100 (against linear polystyrene standards), Mw/Mn= 4.0. The quaternized hyperbranched polyester P-1 was then obtained by reacting the above-described imidazole-ended hyperbranched polyester (25 g) with 22.7 g of 2-chloroethanol in methanol at 50° C. for 20 hrs.

Example 2

Light Stability
Preparation of a Water Soluble, Anionic Dye Ink Composition, I-1

Ink I-1 containing Dye 1 identified above was prepared by mixing the dye concentrate (3.1%) with de-ionized water containing humectants of diethylene glycol (Aldrich Chemical Co.) and glycerol (Acros Co.), each at 6%, a biocide, Proxel GXL® biocide (Zeneca Specialties) at 0.003 wt %, and a surfactant, Surfynol 465® (Air Products Co.) at 0.05 wt. %.

The dye concentration was based on solution absorption spectra and chosen such that the final ink when diluted 1:1000, would yield a transmission optical density of approximately 1.0.

Preparation of Control Ink Recording Elements C-1 Through C-3

The composite side of a polyethylene resin-coated photographic grade paper based support was corona discharge treated prior to coating. Ink receptive layers were composed of a mixture of 0.86 $g/m^2$ of control polymers CP-1 through CP-3, 7.75 $g/m^2$ of gelatin and 0.09 $g/m^2$ of S-100 12 µm polystyrene beads (ACE Chemical Co.), and coated from distilled water on the above mentioned paper support.

Preparation of Invention Ink Recording Elements E-1 Through E-6

Recording elements E-1 through E-6 of the invention were coated the same as described above, using P-1 through P-6 instead of CP-1 through CP-3.

Printing

Elements E-1 through E-6 and control elements C-1 through C-3 were printed using an Epson200® printer using I-1 ink described above. After printing, all images were allowed to dry at room temperature overnight, and the densities were measured at all steps using an X-Rite 820® densitometer. The images were then subjected to a high intensity daylight fading test for 2 weeks, 50 Klux, 5400° K., approximately 25% RH. The Status A blue reflection density nearest to 1.0 was compared before and after fade and a percent density retained was calculated for the yellow dye with each receiver element. The results can be found in Table 1 below.

TABLE 1

| Recording Element | Polymer | Blue Density Before Fade | Blue Density After Fade | % Retained After Fade |
|---|---|---|---|---|
| E-1 | P-1 | 0.93 | 0.78 | 84 |
| E-2 | P-2 | 0.93 | 0.73 | 78 |
| E-3 | P-3 | 0.95 | 0.76 | 80 |
| E-4 | P-4 | 0.95 | 0.73 | 77 |
| E-5 | P-5 | 0.94 | 0.73 | 77 |
| E-6 | P-6 | 0.94 | 0.75 | 80 |
| C-1 | CP-1 | 0.93 | 0.60 | 65 |
| C-2 | CP-2 | 0.94 | 0.57 | 61 |
| C-3 | CP-3 | 0.95 | 0.47 | 49 |

The above results show that the recording elements E-1 through E-6 of the invention, as compared to the control recording elements C-1 through C-3 gave higher % retained density after high intensity daylight fading.

Example 3

Waterfastness
Preparation of a Water Soluble, Anionic Dye Ink Composition, I-2

Ink I-2 was prepared as described in Example 2 except Dye 2 (0.58%) was added in place of Dye 1.

Printing

Elements E-1 through E-6 and control elements C-1 through C-3 were printed as described in Example 2 except I-2 was used instead of I-1. After printing, all images were allowed to dry at room temperature overnight.

The images were then subjected to a waterfastness test (WF) which involves soaking each imaged receiver in room temperature, distilled water for 5 minutes and then allowing the image to dry at room temperature overnight. The image quality of each print was then visually ranked and assigned a value between 0 and 5. The visual ranking is an indirect measure of how well the dye is fixed (dye fixation) to the receiver layer. Zero represents no image degradation (better dye fixation) and 5 represents severe image degradation (poor dye fixation) and the results are summarized in Table 2 below.

TABLE 2

| Recording Element | Polymer | WF Rank |
|---|---|---|
| E-1 | P-1 | 3 |
| E-2 | P-2 | 3 |
| E-3 | P-3 | 4 |
| E-4 | P-4 | 4 |
| E-5 | P-5 | 4 |
| E-6 | P-6 | 4 |
| C-1 | CP-1 | 1 |
| C-2 | CP-2 | 0 |
| C-3 | CP-3 | 5 |

The above results show that the recording elements E-1 through E-6 of the invention, as compared to the control recording elements C-3, gave better dye fixation after the waterfastness test. Although control receiver elements C-1 and C-2 gave better dye fixation than the recording elements of the invention, the light stability was worse as was illustrated in Example 1 above.

Example 4
Light Stability Using Particulates
Preparation of Control Ink Recording Element C-4

Control recording element C-4 was prepared the same as C-1 in Example 2 except the ink receptive layer was composed of two layers. The bottom layer was composed of a mixture of 37.9 g/m² of fumed alumina (Cabot Corp.), 4.3 g/m² of GH-23® poly(vinyl alcohol) (Nippon Gohsei); 0.9 g/m² of dihydroxydioxane (Clariant) hardener, and 0.04 g.m² of Olin 100G® (Olin Co.) surfactant coated from distilled water.

On top of the above layer was then coated a mixture of 2.68 g/m² of fumed alumina, 0.06 g/m² of GH-23 poly(vinyl alcohol), and 0.48 g/m² of CP-1 coated from distilled water.
Preparation of Invention Ink Recording Element E-7

Recording element E-7 of the invention was coated the same as described for control receiver element C-4, except P-5 was used in place of CP-1.
Printing The recording element E-7 of the invention and control recording element C-4 were printed using the Epson 900® printer with corresponding Epson inks (Color cartridge #T005 and Black cartridge #T003). After printing, all images were allowed to dry at room temperature overnight and the densities were measured at all steps using an X-Rite 820® densitometer. The images were then subjected to a high intensity daylight fading test for 2 weeks, 50 Klux, 5400° K., approximately 25% rh. The Status A blue, green or red reflection densities at 50% coverage were compared before and after fade and a percent density retained was calculated for the yellow, magenta and cyan dyes with each receiver element. The results can be found in Table 3 below.

TABLE 3

| Recording Element | % Retained Yellow | % Retained Magenta | % Retained Cyan |
|---|---|---|---|
| E-7 | 66 | 21 | 91 |
| C-4 | 39 | 18 | 89 |

The above results show that the recording element E-7 of the invention, as compared to the control recording element C-4, gave higher % retained density after high intensity daylight fading.

Example 5
Density Using Particulates
Preparation of Control Ink Recording Element C-5

Control recording element C-5 was prepared the same as C-4 in Example 4 above except the top layer was composed of a mixture of 2.90 g/m² of fumed alumina, and 0.32 g/m² of GH-23 poly(vinyl alcohol).
Printing The recording element E-7 of the invention and control recording element C-5 were printed using the Epson 900® printer with corresponding Epson inks. After printing, all images were allowed to dry at room temperature overnight and the densities at 100% coverage (Dmax) were measured for the yellow, magenta and cyan dyes using an X-Rite 820® densitometer. The results can be found in Table 4 below.

TABLE 4

| Recording Element | Dmax Density Yellow | Dmax Density Magenta | Dmax Density Cyan |
|---|---|---|---|
| E-7 | 1.25 | 1.46 | 2.01 |
| C-5 | 1.23 | 1.31 | 1.53 |

The above results show that the recording element E-7 of the invention, as compared to the control recording element C-5, gave higher densities at 100% coverage.

The invention has been described in detail with particular reference to certain preferred embodiments thereof, but it will be understood that variations and modifications can be effected within the spirit and scope of the invention.

What is claimed is:

1. An ink jet printing method, comprising the steps of:
   A) providing an ink jet printer that is responsive to digital data signals;
   B) loading said printer with ink-receptive elements comprising a support having thereon an image-receiving layer comprising a highly branched dendrimer or hyperbranched polymer having a cationic moiety;
   C) loading said printer with an ink jet ink composition comprising water, a humectant, and a water-soluble anionic dye; and
   D) printing on said image-receiving layer using said ink jet ink in response to said digital data signals.

2. The method of claim 1 wherein said highly branched dendrimer or hyperbranched polymer having a cationic moiety has the formula:

$$HB-T_n$$

wherein:

HB is highly branched dendrimer or hyperbranched polymer core;

T is $Q^+X^-$ wherein $Q^+$ is a cationic moiety and $X^-$ is a counterion; and n is an integer of at least 2.

3. The method of claim 2 wherein HB is prepared by a chain polymerization of a monomer of the formula $M^1-R^1-M^2_m$ wherein:

$R^1$ is a linear or branched alky, carbonyl, or aromatic moiety;

$M^1$ and $M^2$ are reactive groups that react independently of each other, $M^1$ being a polymerizable group and $M^2$ being a reactive precursor which initiates the polymerization of $M^1$; and m is an integer of at least 1.

4. The method of claim 2 wherein HB is prepared by a condensation or addition polymerization of a monomer of the formula $M^3-R^2-M^4_p$ wherein:

$R^2$ is a linear or branched alkyl or aromatic moiety;

$M^3$ and $M^4$ are groups that undergo a condensation or addition reaction; and p is an integer of at least 2.

5. The method of claim 2 wherein HB is prepared by a condensation or addition polymerization of monomers having the formula $R^2-M^5_q$ and $R^3-M^6_t$ wherein:

$R^2$ is as defined as above;

$R^3$ is a linear or branched alkyl or aromatic moiety;

$M^5$ and $M^6$ are groups that undergo a condensation or addition reaction;

q is an integer of at least 2; and t an integer of at least 3.

6. The method of claim 3 wherein:

$M^1$ is a non-substituted or substituted vinyl group;

$M^2$ is Y, —$CH_2Y$ or —$CH(CH_3)Y$;

Y is Cl, Br, I, S—C(=S)$ZR^4R^5$(Z=O,N), or —O—$NR^4R^5$; and $R^4$ and $R^5$ are independently —$(CH_2)_r$ (r=1–12), —$C_6H_5$, —C(O)O, or C(O).

7. The method of claim 4 wherein:

$M^3$ and $M^4$ are each independently —COOH, —OH, —C(O)Cl, epoxy, or $NH_2$;

$R^2$ is —$C_6H_3$—, —$(CH_2)_r$ (r=1–12) or $C(R^6)$—; and $R^6$ is a linear or branched alkyl or aromatic group.

8. The method of claim 5 wherein:

$M^5$ and $M^6$ are each independently —COOH, —OH, —C(O)Cl, epoxy, or $NH_2$; and $R^2$ and $R^3$ are each independently —$C_6H_4$—, —$C_6H_4$—O—$C_6H_4$—, —$C_6H_3$, $N(CH_2)_3$—, —$C_4H_8$—, —$C_6H_{10}$—,

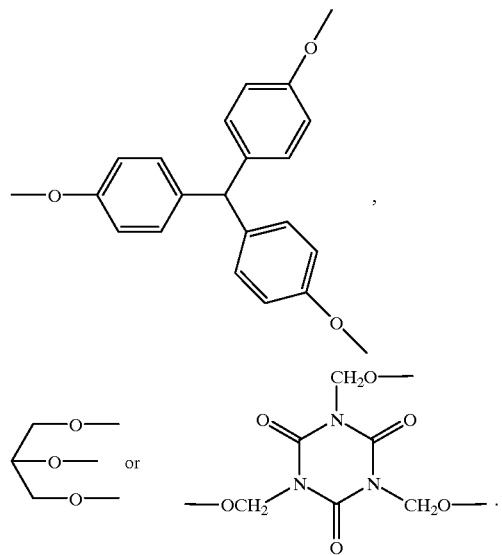

9. The method of claim 2 wherein Q is imidazole, pyridyl, substituted alkyl amine, —$P(Phenyl)_3$ or —$P(R^7)_3$ wherein $R^7$ is a linear or branched alkyl group.

10. The method of claim 2 wherein X is a halide, alkylsulfate, or arylsulfonate group.

11. The method of claim 2 wherein X is chloride or acetate.

12. The method claim 1 wherein said highly branched dendrimer or hyperbranched polymer having a cationic moiety has a molecular weight of from about 150 to about 1,000,000.

13. The method claim 1 wherein said highly branched dendrimer or hyperbranched polymer has a ratio of weight-average molecular weight to number-average molecular weight of from about 1.01 to 50.

14. The method of claim 1 wherein said humectant is diethylene glycol, glycerol or diethylene glycol monobutylether.

15. The method of claim 1 wherein said image-receiving layer also contains a binder.

16. The method of claim 15 wherein said binder is gelatin or poly(vinyl alcohol).

17. The method of claim 15 wherein said binder contains particulates.

18. The method of claim 17 wherein said particulates are inorganic oxides or organic latex polymers.

19. The method of claim 17 wherein said particulates are barium sulfate, calcium carbonate, clay, silica or alumina.

20. The method of claim 1 wherein said anionic dye comprises about 0.2 to about 5 % by weight of said ink jet ink composition.

* * * * *